United States Patent [19]

Roth et al.

[11] 4,386,956

[45] Jun. 7, 1983

[54] METAL RECOVERY PROCESS FROM ALUMINUM DROSS

[75] Inventors: David J. Roth; Lawrence R. Culler, both of Terre Haute; Ralph D. Heifner, Rockville, all of Ind.

[73] Assignee: The Anaconda Company, Denver, Colo.

[21] Appl. No.: 212,408

[22] Filed: Dec. 3, 1980

[51] Int. Cl.³ ..................... C22B 7/00; C22B 21/00
[52] U.S. Cl. ........................................ 75/24; 75/63; 75/68 R; 210/774; 266/227
[58] Field of Search .................. 75/24, 68 R, 63; 266/227; 100/104, 116, 226, 92; 210/774, 493.3, 498, 323.1, 251

[56] References Cited

U.S. PATENT DOCUMENTS

| | | | |
|---|---|---|---|
| 563,769 | 7/1896 | Howard | 75/77 |
| 2,278,135 | 3/1942 | Osborn | 266/227 |
| 3,198,505 | 8/1965 | Amdur et al. | 266/227 |
| 3,517,918 | 6/1970 | Cenkner | 266/227 |
| 3,999,980 | 12/1976 | Montagna | 75/68 R |
| 4,003,559 | 1/1977 | Kuwano et al. | 266/227 |
| 4,057,232 | 11/1977 | Ross et al. | 266/227 |

FOREIGN PATENT DOCUMENTS 201817  8/1923  United Kingdom ............... 266/227

*Primary Examiner*—M. J. Andrews
*Attorney, Agent, or Firm*—Allegretti, Newitt, Witcoff & McAndrews, Ltd.

[57] ABSTRACT

An improved method for recovery of metal, particularly aluminum, from metal bearing dross utilizes a trough for collection of the dross. A wedge member compresses the dross in the trough. In this manner, metal is decanted from the compressed dross and flows through slots in the bottom or passages in the walls of the trough for collection in a pan, or becomes concentrated at the edges or walls of the volume of dross. The trough and wedge members also serve to cool the dross material thereby diminishing metal loss due to thermite reaction. The compressed dross coalesces and solidifies, is broken and is mechanically separated. The larger dross components from the separation process are substantially metallic and may be recycled through the furnace. The remaining components are charged in a vortex melting furnace for the lowest possible melt loss. This also effects segregation of the remaining metal from the dross by melting the metal and allowing the dross to rise to the top of the bath. The improved method of the present invention provides for recovery of about 95% of aluminum metal from a dross which contains about 70% aluminum as compared with a recovery rate of about 50% aluminum metal utilizing a generally known prior art technique.

18 Claims, 11 Drawing Figures

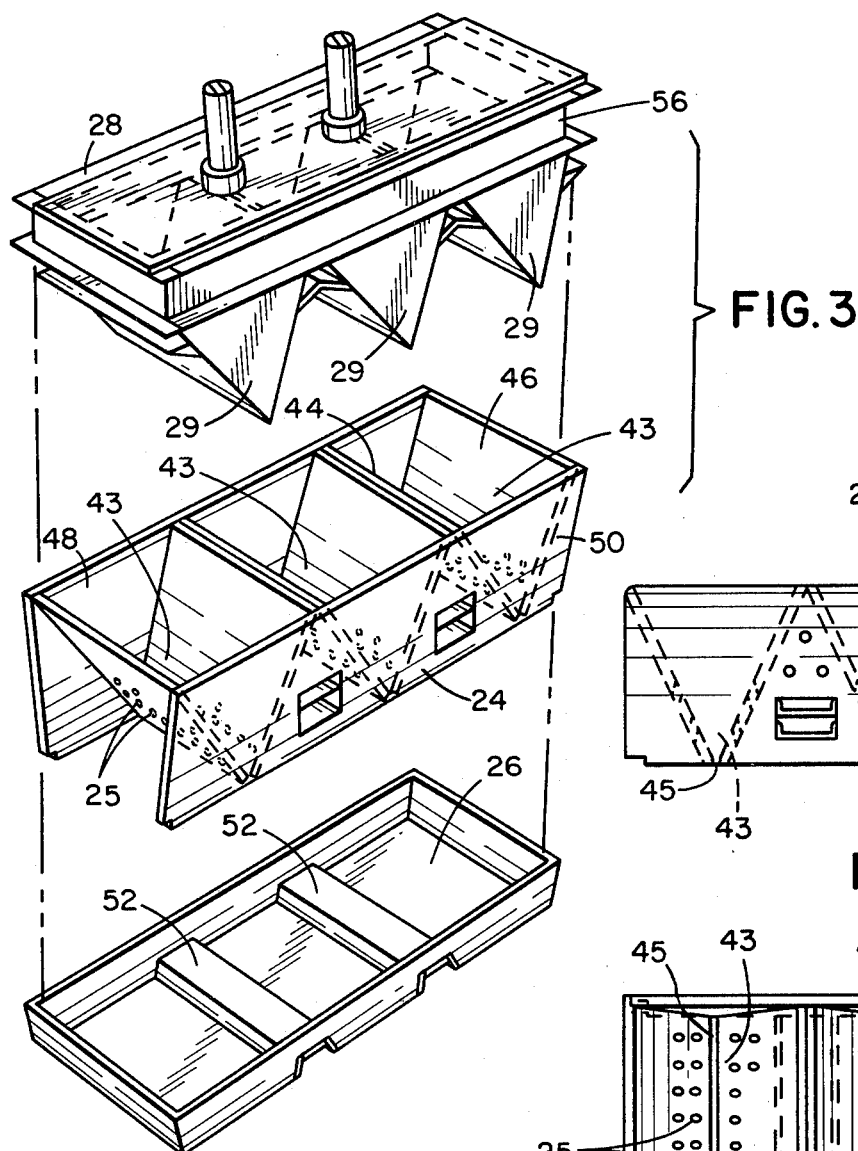

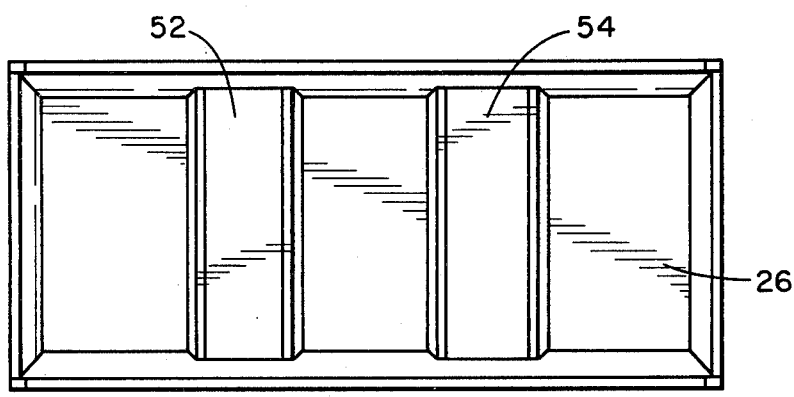
FIG.7
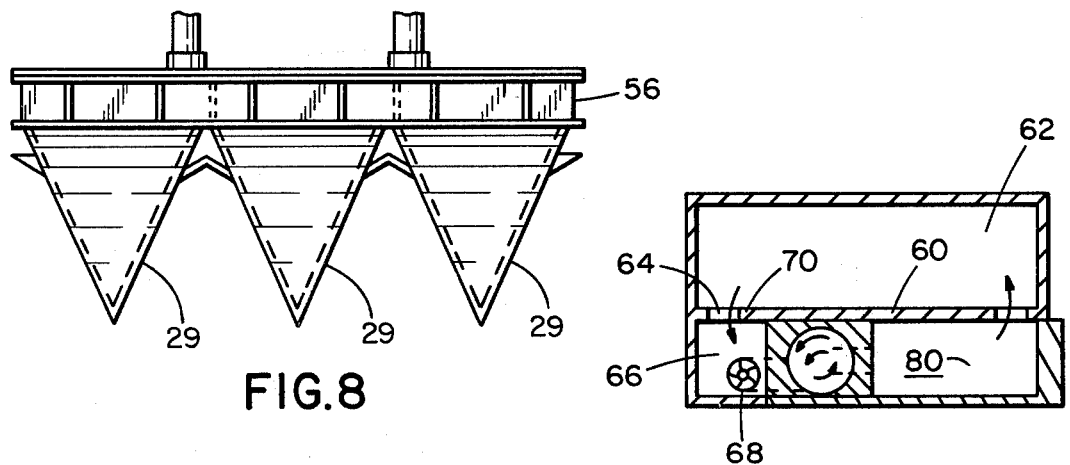
FIG.8
FIG.11
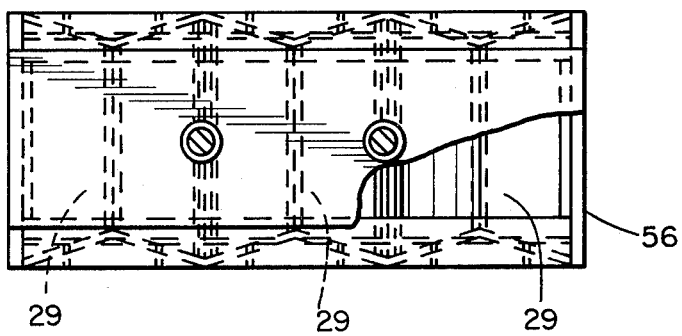
FIG.9
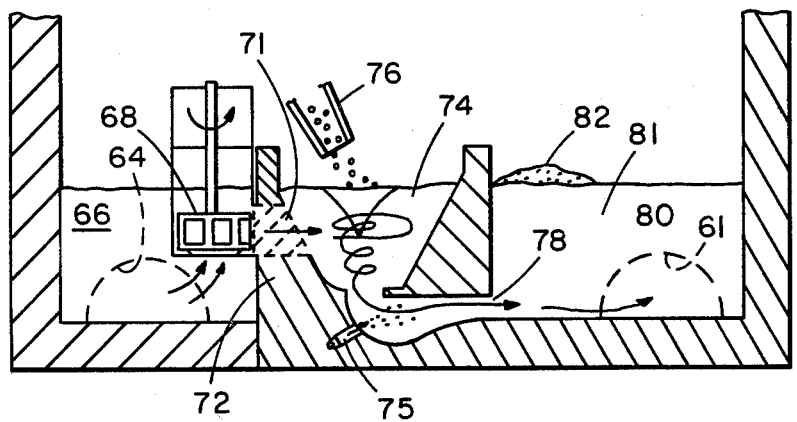
FIG.10

METAL RECOVERY PROCESS FROM ALUMINUM DROSS

BACKGROUND OF THE INVENTION

This invention relates to an improved method and apparatus for recovery of metal, particularly aluminum, from dross which has been skimmed from a reverberatory or electric furnace.

Aluminum dross is a combination of aluminum metal, various oxides, nitrates and carbides and constitutes a by-product of an aluminum melting operation. Generally the dross floats on the top of the molten aluminum metal in the furnace. The dross can contain anywhere from 30% to 90% aluminum depending upon the particular processing technique and type of furnace. Dross, therefore, in an aluminum melting operation includes a significant amount of aluminum metal which is considered a valuable resource and which desirably must be recovered.

Heretofore a typical dross recovery system for aluminum melting called for spreading and cooling the dross on a floor surface, for example, an aluminum floor surface. Because this cooling process is rather slow, a great deal of the aluminum metal in the dross is lost due to a thermite reaction, i.e., exothermic oxidation of aluminum metal. Typically 2% of the aluminum metal is lost for each minute of cooling. Thus, a dross which initially has about 70% aluminum metal will decrease to about 40% to 60% aluminum metal after cooling because of losses due to a thermite reaction.

To separate the aluminum metal from cooled and solidified dross, one must next crush and break the dross into an aggregate. The aggregate is then further broken down in a conventional ball mill. At each of these stages a certain amount of the aluminum is lost as dust. Ultimately the dross concentrate is processed in a conventional rotary salt furnace which permits the aluminum metal to separate from the remaining dross material. Further metal losses are observed as a result of the furnace operation due to additional thermite reaction. Also there is loss due to formation of slag or dross in the salt furnace. Ultimately the recovery of aluminum by this process is on the order of 40% to 50% of the original aluminum metal in the dross. Consequently a method and mechanism for improving the recovery of aluminum metal as well as other metals from their dross will have a significant commercial and conservation impact.

A technique for recovery of zinc metal from a dross concentrate is disclosed in Ross et al, U.S. Pat. No. 4,057,232. Ross discloses a method for separating molten zinc from dross by use of a press mechanism which compresses the dross in a ladle and squeezes the free metal through openings in the ladle. This concept of using compression to separate free metal from a molten mixture is also taught in Howard, U.S. Pat. No. 563,769, with repect to separation of the noble metal, silver, from lead bullion. Osborn, in U.S. Pat. No. 2,278,135, discloses a dross press for removing antimony from tin, for example. Kuwano et al, U.S. Pat. No. 4,003,559, teaches an agitating device which is designed to squeeze free metallic zinc from dross. In Kuwano et al, the dross is violently stirred in order to effect the separation of the free metal from the dross.

So far as applicants can determine, however, there are no prior art references or practices which utilize compression techniques or apparatus for the separation of aluminum from dross. The present invention therefore contemplates a method of improving aluminum metal recovery from dross and the special apparatus necessary to effect such improved recovery. The invention also may be applied to the recovery of brass and copper from appropriate dross.

SUMMARY OF THE INVENTION

To practice the present invention, a special tray comprising multiple parallel troughs is positioned adjacent an aluminum melting or holding furnace to collect dross from that furnace. Upon withdrawal of the dross from the furnace and placement thereof in the tray, aluminum begins to flow through openings in each trough and into a collection pan. As soon as the troughs are filled with dross, the dross is compressed. This causes additional aluminum metal to flow from the dross through openings in the tray and into the collection pan. During the compression operation, the dross is quickly cooled to thereby diminish thermite or oxidation reactions. Compression also causes small droplets of aluminum dispersed throughout the dross to coalesce into large plates at the surface of the dross. The cooled dross material is then preferably screened to remove aluminum oxide dust. Subsequently the aggregate left from the screening operation is shot blasted, tumbled and then mechanically separated into a large size aggregate, which is substantially pure aluminum, and a remaining smaller aggregate which contains a majority of aluminum but must be subjected to special melting practices for maximum aluminum recovery. The large size concentrate may be immediately recycled through a common aluminum melting furnace. The smaller size concentrate is treated in a special vortex melting furnace. The addition of flux to the vortex furnace enhances separation of the entrapped oxides from the aluminum. A nitrogen-argon gas mixture may also be injected into the vortex furnace to enhance separation of aluminum oxide. Utilizing the procedures and apparatus of the present invention, it is possible to effect recovery of 90% to 95% aluminum metal from a dross.

Thus, it is an object of the present invention to provide an improved method for recovery of aluminum metal from dross.

A further object of the present invention is to provide a special apparatus to collect and process dross from an aluminum furnace and to effect improved aluminum metal recovery from the dross.

Another object of the invention is to provide a method of aluminum metal recovery from aluminum furnace dross which utilizes compression forces to effect decanting of the aluminum metal from the dross.

Still a further object of the invention is to provide a method for treatment of dross from an aluminum furnace in which a significant portion of aluminum may be decanted by compression forces from the dross and an equally significant amount of aluminum may be mechanically separated from dross which has been compressed, cooled and mechanically separated into at least two size categories.

A further object of the present invention is to provide an aluminum metal recovery process which includes a special vortex melting furnace that processes dross having a large concentration of aluminum therein by melting the aluminum and permitting flotation of the dross on top of the aluminum bath.

Still a further object of the present invention is to provide an economical way of recovering a maximum amount of aluminum metal from an aluminum dross material.

Another object of the invention is to promote quick cooling of aluminum dross upon removal from a furnace by separating the dross in a plurality of troughs.

A further object of the invention is to promote quick cooling of aluminum dross upon removal from a furnace by compressing the dross with a ram that serves as a heat sink and as a means to restrict access of oxygen to the aluminum in the dross.

A further object of the invention is to apply compressive forces on the dross and thereby effect coalescing of droplets of aluminum into plates at the surface of the dross.

Another object of the invention is to provide a process for recovery of metal from dross which has the aforesaid objects and advantages and which is useful for recovery of aluminum, copper, brass and other metals from their respective dross.

These and other objects, advantages and features of the invention will be set forth in greater detail in the description which follows.

BRIEF DESCRIPTION OF THE DRAWING

In the detailed drawing which follows, reference will be made to the drawing comprised of the following figures:

FIG. 3 is an exploded perspective view of the assembly of the special troughs, decanting pan and compression mechanism for removing aluminum metal from dross;

FIG. 4 is a side elevation of the troughs shown in FIG. 3;

FIG. 5 is a top plan view of the troughs of FIG. 4;

FIG. 6 is a front elevation of the decanting pan associated with the trough of FIGS. 4 and 5;

FIG. 7 is a top plan view of the pan of FIG. 6;

FIG. 8 is a side elevation of the compression head associated with the assembly shown in FIG. 3;

FIG. 9 is a top plan view of the head of FIG. 8;

FIG. 10 is a cross sectional side view of an embodiment of the improved vortex melting furnace for effecting dross separation and aluminum recovery; and FIG. 11 is a top plan view of the furnace shown in FIG. 10.

DESCRIPTION OF THE PREFERRED EMBODIMENT

Figure 1:
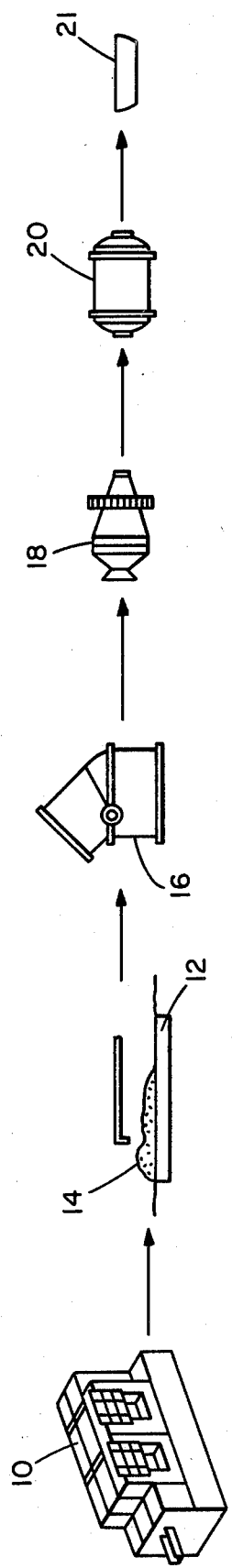
FIG. 1 is a diagramatic flow chart representing the process steps practiced in the prior art to effect aluminum recovery from an aluminum dross material.

FIG. 1 is a diagramatic view illustrating the steps of a prior art method for aluminum metal recovery from the dross taken from an aluminum melting or holding furnace. Typically, dross 14 is withdrawn from an aluminum furnace 10 and spread and cooled on a floor 12. The floor 12 is generally made from a heat sink material, for example, aluminum. During the cooling of the dross, a thermite or oxidizing reaction occurs between the aluminum metal in the dross 14 and the impurities in the dross as well as the oxygen in the air. Thus, a dross 14 which includes approximately 70% free aluminum metal when removed from the furnace 10 may drop in aluminum metal content to between 40% and 60% aluminum. As the cooling of the dross 14 is delayed, the percent of aluminum metal decreases further and the amount of aluminum metal which can be recovered from the dross 14 also decreases.

After the dross 14 is cooled, it is fed into a crusher 16. The crusher 16 breaks the dross 14 into a granulate material. A certain amount of the aluminum metal in the dross 14 is lost as a dust which separates from the granulate due to the crushing operation. The granulate, though, is then fed into a ball mill 18 for further pulverization. Again, there is some loss due to dust formation in the ball mill 18. The material from the ball mill will generally include aluminum metal in an amount of 60% to 65% of the content of the granulate or dross concentrate.

This material is fed into a rotary salt furnace 20 of the type known in the art, and a pound of salt is generally added to the furnace 20 along with every pound of dross concentrate charged due to the relatively low amount of aluminum in the concentrate. A certain amount of aluminum metal is lost due to a thermite reaction in the salt furnace 20. Some aluminum metal is also lost in the slag which is a by-product from the salt furnace 20 melting step. Also, disposal of the slag is a waste disposal problem due to environmental concerns. Ultimately, however, aluminum metal is withdrawn from the salt furnace 20 and poured into a mold 21 for further use.

The amount of recovery of aluminum metal using this process generally will amount to about 50% or less of the aluminum metal available in the original dross 14 where the original dross 14 was comprised of approximately 70% by weight aluminum metal. This recovery is deemed insufficient and for this reason improved methods and apparatus for extracting aluminum metal from dross were sought.

Figure 2:
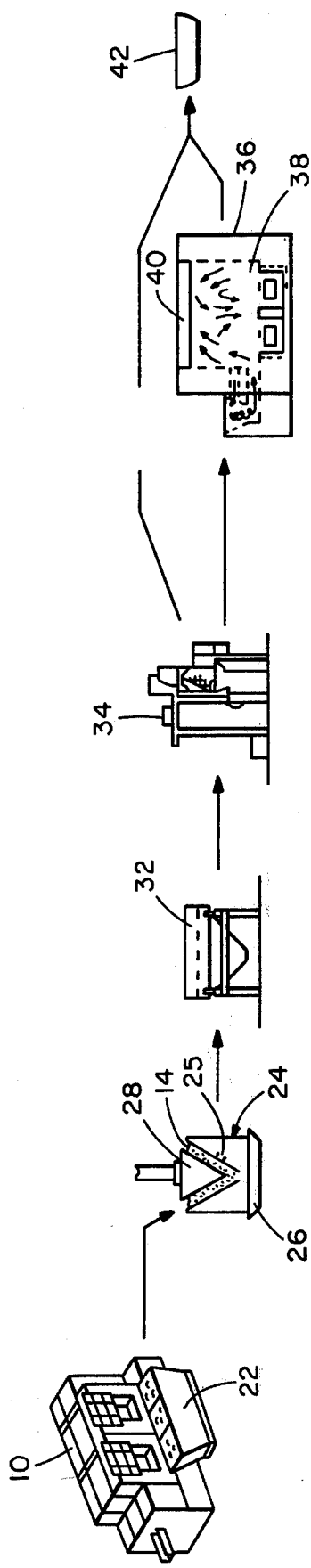
FIG. 2 is a diagramatic flow chart of the sequential steps of the improved method of the present invention for aluminum recovery from dross.

FIG. 2 and the remaining figures illustrate the improved method and apparatus of the present invention as applied to recovery of aluminum and which has been found to increase recovery of free aluminum metal from dross to more than 90%. Referring therefore to FIG. 2, dross 14 is withdrawn from the melting or holding furnace 10 and is immediately directed into a tray and pan collector 22 which is maintained adjacent the furnace 10. In this manner there is a quick transfer of dross 14 from the furnace 10 to the collector 22. This immediate transfer tends to diminish thermite reaction.

The collector 22 is comprised of a compression tray 24 mounted on a decanting pan 26, and a separate compression wedge mechanism 28 complementary with the tray 24. The collector 22 is appropriately sized for cooperation with each particular furnace. Initially, without dross compression, some aluminum metal will drain or decant through passages or openings 25 in the walls of the troughs 43 forming the tray 24 and a bottom slot 45 and flow into the pan 26. Openings 25 are preferably vertical passages through walls 44, 46. After the tray 24 is filled with dross 14, the ram or wedge mechanism 28 is impinged against the dross 14 to compact the dross 14 and effect further transfer of aluminum metal from the dross 14 through the openings 25 into the pan 26.

Compression by this mechanism is preferably effected above a threshold pressure which is determined empirically and is dependent upon the amount of free aluminum metal in the dross, the trough size and material, trough shape, dross temperature and other physical parameters of the system. The compression causes pooling of the aluminum metal in the dross 14 and migration of the metal pools to the edge surfaces of the dross 14. This is followed by quick cooling of the dross 14 and prompt solidification of the dross 14 thereby further diminishing thermite reactions and loss of aluminum due to such reactions. With the completion of this compression step, there is approximately a 50% aluminum metal recovery. Thus, the initial compression step provides for aluminum metal recovery which generally exceeds the total recovery associated with the described prior art process. Moreover, the compression step enhances the subsequent steps and aluminum recovery by causing quick solidification and pooling of large regions of aluminum metal near the edges or surfaces of the dross material.

Experiments have shown, for example, that dross removed from an aluminum reverberatory furnace in the range of 1300° F. to 1600° F. must be compressed within twenty (20) minutes of removal from the furnace. Otherwise, the dross will cool and solidify. A minumum or threshold pressure of about 64 p.s.i. has been found necessary to cause coalescing of aluminum in the desired manner. This may vary depending upon the factors previously mentioned.

As a next step, the solidified dross 14 is transferred to a screening device 32 as shown in FIG. 2 where the large components of the dross 14 are separated from the loose oxide dust of the dross 14 and the dross 14 is agitated and broken into manageable parts. About 20% of the dross is removed by this screening process as dust. The material removed is generally an aluminum oxide dust. Very little or no aluminum metal is, however, lost by the screening process.

The remaining dross material which includes free aluminum metal mixed in with various oxides, nitrides and the like is then transferred to a blaster and separator system 34. The blaster and separator system 34 performs a number of functions including further breaking of the dross, cleaning the larger portions of dross material, and separting the larger sizes of the dross material from the remainder of the dross material. These larger components or portions are generally aluminum metal or globules of material which are at least 95% aluminum metal. Thus, the separator system 34 is designed to separate items having a general size of greater than 7 cms. (3 inches) mean diameter from the remaining dross material. This larger size material is generally 95% to 98% pure aluminum metal and may be recharged back into the furnace 10.

The remaining smaller size constituent or concentrate from the dross 14 contains from 85% to 90% aluminum metal. Of course, again there is some dust which is formed during this procedure and approximately 20% of the dross material is removed as dust. Very little or no free aluminum metal is removed as dust. Only oxides and other impurities are removed.

The smaller sized concentrate or granulate is added to a vortex melting furnace 36 where a small addition of flux is also fed into the furnace 36 and melted to enhance aluminum metal separation. Importantly, because of the method of the present invention, a lesser amount of flux is required to enhance separation. This is a significant improvement over technology presently known to the inventors. Use of a vortex furnace, as described, reduces the melt loss of small particles due to melting that takes place in a non-oxidizing atmosphere and to cold changing of the furnace.

A layer of skim or dross 40, will then form on top of the aluminum bath 38 due to a gas injection and flux addition. The skim 40 may then be cooled and recycled through the screen 32 for further concentration. The aluminum metal layer 38 may be withdrawn into a mold 42 and processed or recirculated through the furnace 10.

A small amount of aluminum is lost due to the melting procedure in the furnace 36. However, a recovery of about 95% aluminum metal is effected by processing the original dross 14 in the manner described. This is about double the recovery rate associated with the known prior art procedure illustrated by FIG. 1.

The collector 22 of the present invention is depicted in greater detail in FIGS. 3-9, and the electric vortex furnace is depicted by FIGS. 10 and 11.

The compression operation is effected by use of the collector 22 as depicted in FIGS. 3-9. Specifically, the collector 22 includes the tray 24 which cooperatively sits in pan 26 and is adapted to receive compression wedge or ram mechanism 28. The tray 24 is comprised of a plurality of separate, parallel troughs 43 each defined by downwardly and inwardly inclined side walls 44 and 46 which cooperate with end walls 48 and 50. Each side wall 44 and 46 inclines inwardly and downwardly and defines a space or slot 45 between the walls 44 and 46 at the juncture or apex of the walls 44 and 46. This slot 45 can vary between ½ inch to 2½ inches in width. Each inclined side wall 44 and 46 includes a plurality of preferably vertical openings 25 which are sized to permit the free flow of aluminum metal yet which prohibit or prevent the passage of dross 14. The diameter of these openings can vary between ½ inch and 2½ inches.

The tray 24 is fabricated to sit in a collector or decanting pan 26. Decanting pan 26 is generally rectangular and includes two bottom passages or horizontal channels 52 and 54 which are sized and spaced to receive the forks of a fork lift truck so that the entire assembly including the tray 24 as situated on the pan 26 may be moved.

As shown in FIGS. 8 and 9, a complementary ram or wedge mechanism 28 comprised of separate wedge members 29 is formed to cooperate with the respective troughs 43 and compress dross material 14 that is retained in each trough 43. Compression forces aluminum metal through the openings 25 and effects aluminum metal pooling as previously described. The separate wedge members 29 are interconnected by a cross member 56 which serves to align the wedge members 29 in a proper fashion so that the members 29 may be simultaneously positioned into compressive cooperation with the troughs 43. The nose of the wedge members 29 can also be designed to have different depths of penetration into trough 20 depending on the type of dross compressed, e.g., saw tooth for reverberatory dross, smooth for electric furnace dross.

The cross member 56 is mounted on a pneumatic or hydraulic plunger 57 which is positioned over the tray 24. In this manner the wedge members 29 can be driven downwardly into the troughs 43 and provide significant pressure against the dross 14. This removes aluminum metal from the dross to collect in the pan 26 and also causes aluminum metal to pool in the dross 14 particularly at the edges or surfaces of the dross.

To supplement the cooling effect of wedge members 29, a coolant, generally water, may be circulated through passages or tubes in the wedge members 29.

The blaster and separator system 34 may be any one of a number of blasters and separators known to those skilled in the art for impinging particulate material on an item and separating constituent solid materials into size categories. The size category separation found to be most advantageous is separation of particles having greater than 7 cm. (3 inch) mean diameter from that having less than 7 cm. (3 inch) mean diameter.

The smaller sized dross concentrate from the blaster/separator system 34 is fed into the furnace 36. FIGS. 10 and 11 illustrate one embodiment of furnace 36 which is useful in the practice of the present invention. There it will be seen that a furnace 36 includes a central heating bay 62. The heating bay 62 is connected by a passage 64 to a pumping bay 66 in which a vortex metal pump 68 is positioned. The pumping bay 66 is separated from the heating bay 62 by a wall 70 under which the molten metal must be guided. The pump 68 is a molten metal pump designed to impel molten metal through a passage 71 in wall 72 and into a charging bay 74. Smaller sized concentrate from the blaster/separator system 34 is fed through a charging nozzle 76 into the charging bay 74. There the material becomes molten and an influx of molten material directed by the pump 68 will cause a vortex flow within the charging bay 74.

The vortex flow will direct a flow of melted aluminum and dross through a passage 78 at the lower end of the vortex flow into a skimming bay 80 and connected heating bay 62. Aluminum metal will form a lower layer in the bay 80 and dross material 82 will float on the lower aluminum metal layer 81. Metal from the skimming bay 80 may be withdrawn under a wall 60 through passage 61 into the heating bay 62 for ultimate removal to a casting mold or the like. Dross material 82 may be skimmed for further recycling and retreatment to remove aluminum. Gas may be injected into the charging bay 74 through injector 75 to enhance separation of aluminum from dross.

It is, of course, possible to vary the apparatus of the present invention by utilizing different designs for furnaces, separators, screening devices and the like. It is also possible to vary somewhat the order of the steps when performing the method of the invention. Finally, the apparatus and method of the invention is applicable to recovery of other metals such as brass or copper from their respective dross materials. The invention, therefore, is to be limited only by the following claims and their equivalents.

What is claimed is:

1. An improved method for recovery of free aluminum metal from a metal bearing dross containing free aluminum metal and oxides of said metal, said method comprising the steps of:
    (a) collecting the dross in a receptacle of the type having at least one trough with at least one downwardly and inwardly inclined side wall with metal flow passages through the wall;
    (b) collecting the free aluminum metal which decants through the passages;
    (c) mechanically compacting the dross by applying a compressive force on the dross and against the inclined wall above a threshold pressure to pool free aluminum metal within a dross, effect migration of the free aluminum metal toward a boundary surface of the compacted dross, decant a portion of said free aluminum through the passage and inhibiting the oxygen supply to the free aluminum metal in the dross; and
    (d) cooling the compacted dross and free aluminum metal to solidify the free aluminum metal;
    such that thermite reaction of free aluminum metal and oxygen in the dross is diminished by the combination of compacting above the threshold pressure and cooling of the metal.

2. The method of claim 1 including the subsequent step of mechanically breaking the compacted dross to recover additional solidified free aluminum metal.

3. The method of claim 1 including maintaining vertical passages in the side wall.

4. The method of claim 1 including maintaining passages in the side wall having a diameter in the range ½ inch to 2½ inches.

5. The method of claim 1 wherein including maintaining a horizontal slot at the bottom of the trough.

6. The method of claim 7 wherein said slot has a width in the range of ½ inch to 2½ inches.

7. The method of claim 1 including maintaining opposed inclined side walls to form the trough.

8. The method of claim 2 including the step of separating free aluminum metal from the oxide.

9. The method of claim 8 wherein the step of separating comprises screening to retain the free metal.

10. The method of claim 1 wherein the threshold pressure of the mechanical compression of the dross in step (c) is about 64 pounds per square inch.

11. An improved method for recovery of free aluminum metal from aluminum metal bearing dross where said dross also includes oxide impurities, said method comprising the steps of;
    (a) collecting the dross in a receptacle of the type having at least one trough with at least one downwardly and inwardly inclined sidewall having metal flow passages through the wall;
    (b) collecting free aluminum metal which decants through the passages;
    (c) mechanically compacting the dross by applying a compressive force on the dross and against the inclined wall above the threshold pressure to pool free aluminum metal within the dross, effect migration of the free aluminum metal toward a boundary surface of the compacted dross, decant a portion of said free aluminum metal through the passages and inhibit the oxygen supply to the free aluminum metal in the dross;
    (d) cooling the compressed dross and free aluminum metal to solidify the free aluminum metal;
    such that thermite reaction of free aluminum metal and oxygen in the dross is diminished by the combination of compacting above the threshold pressure and cooling of the metal;
    (e) removing compacted dross from the receptacle;
    (f) mechanically breaking the compacted dross to form components including oxide dust;
    (g) separating the components of the dross having a larger mean diameter from the remainder of the dross, said larger mean diameter components generally comprising metal, said remainter including a granulate and an oxide dust; and
    (h) melting substantially the granulate remainder of the dross to thereby segregate a multon metal portion from the remainder of the dross.

12. The method of claim 11 including the additional step of further separating the remainder of the dross by collecting oxide dust.

13. The method of claim 11 wherein melting the granulate remainder dross includes the step of;

(a) introducing a charge of graulate remainder dross to a melting pot adjacent a main furnace crucible;

(b) melting the dross in the pot; and (c) pumping the melted dross into the lower portion of the crucible for segregation into a molten metal lower layer and a dross upper layer.

14. The method of claim 11 including the step of introducing an inert gas mixture to the molten mixture to enhance separation of the molten metal.

15. The method of claim 14 wherein the inert gas is taken from the group consisting of argon, nitrogen and a mixture of nitrogen and argon.

16. The method of claim 13 including the step of adding a flux material to the melting pot.

17. The method of claim 13 including the step of pumping the molten material by vortex action to enhance metal separation.

18. The method of claim 13 including the step of skimming dross from the crucible and recycling the skimmed dross through at least some of the previous aluminum recovery steps.

* * * * *